United States Patent
Hong et al.

(10) Patent No.: US 10,440,691 B2
(45) Date of Patent: Oct. 8, 2019

(54) METHOD FOR CONTROLLING CONNECTION STATUS OF UE AND APPARATUS THEREOF

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-Do (KR)

( * ) Notice: Subject to any disclaimer, the term of this patent is extended or adjusted under 35 U.S.C. 154(b) by 26 days.

(21) Appl. No.: 15/716,595

(22) Filed: Sep. 27, 2017

(65) Prior Publication Data

US 2018/0098311 A1    Apr. 5, 2018

(30) Foreign Application Priority Data

Sep. 30, 2016 (KR) .......... 10-2016-0126260
Sep. 12, 2017 (KR) .......... 10-2017-0116319

(51) Int. Cl.
*H04W 72/04* (2009.01)
*H04W 52/02* (2009.01)
(Continued)

(52) U.S. Cl.
CPC ....... *H04W 72/0406* (2013.01); *H04L 67/327* (2013.01); *H04M 1/72519* (2013.01); *H04W 52/02* (2013.01); *H04W 52/0212* (2013.01); *H04W 76/10* (2018.02); *H04W 76/27* (2018.02); *H04W 76/38* (2018.02); *Y02D 70/00* (2018.01); *Y02D 70/1262* (2018.01); *Y02D 70/1264* (2018.01); *Y02D 70/21* (2018.01)

(58) Field of Classification Search
CPC . H04W 72/0406; H04W 76/27; H04W 52/02; H04W 76/10; H04W 52/0212; H04W 76/38; H04M 1/72519; H04M 76/38; H04L 67/327; Y02D 70/00; Y02D 70/21; Y02D 70/1264; Y02D 70/1262
See application file for complete search history.

(56) References Cited

U.S. PATENT DOCUMENTS

2012/0058764 A1    3/2012    Kang et al.
2012/0064892 A1    3/2012    Kim
(Continued)

FOREIGN PATENT DOCUMENTS

| KR | 10-2012-0025997 A | 3/2012 |
|---|---|---|
| KR | 10-2012-0028706 A | 3/2012 |
| KR | 10-2013-0090831 A | 8/2013 |

OTHER PUBLICATIONS

Catt, "Paging in Extended DRX for Light Connection", R2-164845, 3GPP TSG-RAN WG2 Meeting#95, Gothenburg, Sweden, Aug. 22-26, 2016, pp. 1-2.

*Primary Examiner* — Moo Jeong
(74) *Attorney, Agent, or Firm* — IP Leagal Services, LLC

(57) ABSTRACT

Provided as a method and an apparatus for controlling a connection status of a UE. The method includes receiving specific RRC status instruction information for a UE from a mobility management entity (MME) and determining a RRC status for the UE based on the specific RRC status instruction information when the RRC status for the UE is changed, in which the specific RRC status is different from a RRC connection status and a RRC idle status.

13 Claims, 6 Drawing Sheets

(51) Int. Cl.
  *H04W 76/27* (2018.01)
  *H04W 76/10* (2018.01)
  *H04M 1/725* (2006.01)
  *H04L 29/08* (2006.01)
  *H04W 76/38* (2018.01)

(56) References Cited

U.S. PATENT DOCUMENTS

| | | |
|---|---|---|
| 2012/0182896 A1 | 7/2012 | Jang et al. |
| 2012/0184281 A1 | 7/2012 | Kim et al. |
| 2012/0207112 A1 | 8/2012 | Kim et al. |
| 2012/0207130 A1 | 8/2012 | Jang et al. |
| 2012/0213107 A1 | 8/2012 | Jang et al. |
| 2012/0213129 A1 | 8/2012 | Jang et al. |
| 2012/0213137 A1 | 8/2012 | Jeong et al. |
| 2012/0213172 A1 | 8/2012 | Kim et al. |
| 2012/0213207 A1 | 8/2012 | Jang et al. |
| 2012/0214537 A1 | 8/2012 | Kim et al. |
| 2012/0257510 A1 | 10/2012 | Jeong et al. |
| 2012/0257559 A1 | 10/2012 | Kim et al. |
| 2012/0257562 A1 | 10/2012 | Kim et al. |
| 2012/0257569 A1 | 10/2012 | Jang et al. |
| 2012/0257570 A1 | 10/2012 | Jang et al. |
| 2012/0257601 A1 | 10/2012 | Kim et al. |
| 2012/0258750 A1 | 10/2012 | Kim et al. |
| 2013/0039232 A1 | 2/2013 | Kim et al. |
| 2013/0040597 A1 | 2/2013 | Jang et al. |
| 2013/0044670 A1 | 2/2013 | Jang et al. |
| 2013/0044708 A1 | 2/2013 | Kim et al. |
| 2013/0053103 A1 | 2/2013 | Kim et al. |
| 2013/0089029 A1 | 4/2013 | Jang et al. |
| 2013/0143610 A1 | 6/2013 | Jeong et al. |
| 2013/0183969 A1 | 7/2013 | Kang et al. |
| 2013/0201960 A1 | 8/2013 | Kim et al. |
| 2013/0203418 A1 | 8/2013 | Jang et al. |
| 2013/0235780 A1 | 9/2013 | Kim et al. |
| 2013/0286883 A1 | 10/2013 | Kim et al. |
| 2014/0016559 A1 | 1/2014 | Jang et al. |
| 2014/0023030 A1 | 1/2014 | Jeong et al. |
| 2014/0023032 A1 | 1/2014 | Kim et al. |
| 2014/0023055 A1 | 1/2014 | Jeong et al. |
| 2014/0029563 A1 | 1/2014 | Kim et al. |
| 2014/0036685 A1 | 2/2014 | Kim et al. |
| 2014/0092812 A1 | 4/2014 | Jang et al. |
| 2014/0161111 A1 | 6/2014 | Kim et al. |
| 2014/0179320 A1 | 6/2014 | Jang et al. |
| 2014/0211685 A1 | 7/2014 | Kim et al. |
| 2014/0211742 A1 | 7/2014 | Kim et al. |
| 2014/0226613 A1 | 8/2014 | Kim et al. |
| 2014/0233452 A1 | 8/2014 | Kim et al. |
| 2014/0233524 A1 | 8/2014 | Jang et al. |
| 2014/0241324 A1 | 8/2014 | Jang et al. |
| 2014/0286240 A1 | 9/2014 | Kim et al. |
| 2014/0287694 A1 | 9/2014 | Kim et al. |
| 2014/0287726 A1 | 9/2014 | Jang et al. |
| 2014/0295820 A1 | 10/2014 | Kim et al. |
| 2014/0317456 A1 | 10/2014 | Kim et al. |
| 2014/0321388 A1 | 10/2014 | Jeong et al. |
| 2014/0334371 A1 | 11/2014 | Kim et al. |
| 2014/0341011 A1 | 11/2014 | Jeong et al. |
| 2014/0341059 A1 | 11/2014 | Jang et al. |
| 2014/0348050 A1 | 11/2014 | Kim et al. |
| 2014/0370905 A1 | 12/2014 | Kim et al. |
| 2014/0378114 A1 | 12/2014 | Lim et al. |
| 2015/0003312 A1 | 1/2015 | Jeong et al. |
| 2015/0003385 A1 | 1/2015 | Kim et al. |
| 2015/0004924 A1 | 1/2015 | Kim et al. |
| 2015/0036635 A1 | 2/2015 | Jang et al. |
| 2015/0038158 A1 | 2/2015 | Kim et al. |
| 2015/0043418 A1 | 2/2015 | Jang et al. |
| 2015/0043505 A1 | 2/2015 | Kim et al. |
| 2015/0045025 A1 | 2/2015 | Lim et al. |
| 2015/0063305 A1 | 3/2015 | Kim et al. |
| 2015/0078286 A1 | 3/2015 | Kim et al. |
| 2015/0085842 A1 | 3/2015 | Jang et al. |
| 2015/0087296 A1 | 3/2015 | Kim et al. |
| 2015/0087313 A1 | 3/2015 | Kim et al. |
| 2015/0099501 A1 | 4/2015 | Kim et al. |
| 2015/0117286 A1 | 4/2015 | Kim et al. |
| 2015/0117287 A1 | 4/2015 | Kim et al. |
| 2015/0124766 A1 | 5/2015 | Jang et al. |
| 2015/0124767 A1 | 5/2015 | Jang et al. |
| 2015/0124768 A1 | 5/2015 | Jang et al. |
| 2015/0124788 A1 | 5/2015 | Jang et al. |
| 2015/0124789 A1 | 5/2015 | Jang et al. |
| 2015/0126205 A1 | 5/2015 | Kim et al. |
| 2015/0131635 A1 | 5/2015 | Jang et al. |
| 2015/0133181 A1 | 5/2015 | Kim et al. |
| 2015/0134837 A1 | 5/2015 | Jeong et al. |
| 2015/0134838 A1 | 5/2015 | Jeong et al. |
| 2015/0163745 A1 | 6/2015 | Kim et al. |
| 2015/0173030 A1 | 6/2015 | Kim et al. |
| 2015/0173031 A1 | 6/2015 | Kim et al. |
| 2015/0181461 A1 | 6/2015 | Kim et al. |
| 2015/0181471 A1 | 6/2015 | Jang et al. |
| 2015/0181540 A1 | 6/2015 | Kim et al. |
| 2015/0181541 A1 | 6/2015 | Kim et al. |
| 2015/0181593 A1 | 6/2015 | Kim et al. |
| 2015/0189605 A1 | 7/2015 | Kim et al. |
| 2015/0189606 A1 | 7/2015 | Kim et al. |
| 2015/0189657 A1 | 7/2015 | Kim et al. |
| 2015/0195798 A1 | 7/2015 | Kim et al. |
| 2015/0195799 A1 | 7/2015 | Kim et al. |
| 2015/0201395 A1 | 7/2015 | Jeong |
| 2015/0215897 A1 | 7/2015 | Jang et al. |
| 2015/0230253 A1 | 8/2015 | Jang et al. |
| 2015/0271740 A1 | 9/2015 | Jang et al. |
| 2015/0271796 A1 | 9/2015 | Jang et al. |
| 2015/0351134 A1 | 12/2015 | Kim et al. |
| 2015/0382247 A1 | 12/2015 | Jang et al. |
| 2015/0382248 A1 | 12/2015 | Jang et al. |
| 2015/0382249 A1 | 12/2015 | Jang et al. |
| 2015/0382256 A1 | 12/2015 | Jang et al. |
| 2015/0382257 A1 | 12/2015 | Jang et al. |
| 2016/0014672 A1 | 1/2016 | Jang et al. |
| 2016/0014673 A1 | 1/2016 | Jang et al. |
| 2016/0014721 A1 | 1/2016 | Kim et al. |
| 2016/0021628 A1 | 1/2016 | Jang et al. |
| 2016/0021629 A1 | 1/2016 | Jang et al. |
| 2016/0021630 A1 | 1/2016 | Jang et al. |
| 2016/0029207 A1 | 1/2016 | Kim et al. |
| 2016/0029208 A1 | 1/2016 | Kim et al. |
| 2016/0029209 A1 | 1/2016 | Kim et al. |
| 2016/0029309 A1 | 1/2016 | Kim et al. |
| 2016/0029310 A1 | 1/2016 | Kim et al. |
| 2016/0029317 A1 | 1/2016 | Kim et al. |
| 2016/0029414 A1 | 1/2016 | Kim et al. |
| 2016/0037313 A1 | 2/2016 | Jeong et al. |
| 2016/0037451 A1 | 2/2016 | Kim et al. |
| 2016/0037452 A1 | 2/2016 | Kim et al. |
| 2016/0050713 A1 | 2/2016 | Kim et al. |
| 2016/0066229 A1 | 3/2016 | Jang et al. |
| 2016/0119875 A1 | 4/2016 | Kim et al. |
| 2016/0198496 A1 | 7/2016 | Jeong et al. |
| 2016/0286528 A1 | 9/2016 | Kim et al. |
| 2016/0353365 A1 | 12/2016 | Jang et al. |
| 2016/0360479 A1 | 12/2016 | Kim et al. |
| 2016/0366625 A1 | 12/2016 | Kim et al. |
| 2017/0006587 A1 | 1/2017 | Kim et al. |
| 2017/0019930 A1* | 1/2017 | Lee .................. H04W 74/0833 |
| 2017/0048053 A1 | 2/2017 | Kim et al. |
| 2017/0048835 A1 | 2/2017 | Kim et al. |
| 2017/0064626 A1 | 3/2017 | Jeong et al. |
| 2017/0070360 A1 | 3/2017 | Kim et al. |
| 2017/0150447 A1 | 5/2017 | Kim et al. |
| 2017/0150466 A1* | 5/2017 | Sunell .................... H04W 4/70 |
| 2017/0150530 A1 | 5/2017 | Kim et al. |
| 2017/0164312 A1 | 6/2017 | Jang et al. |
| 2017/0208556 A1 | 7/2017 | Kim et al. |
| 2017/0223746 A1 | 8/2017 | Jeong et al. |
| 2017/0231028 A1 | 8/2017 | Kim et al. |
| 2017/0257792 A1 | 9/2017 | Kim et al. |
| 2017/0257903 A1 | 9/2017 | Kim et al. |
| 2017/0303334 A1 | 10/2017 | Kim et al. |

(56) References Cited

U.S. PATENT DOCUMENTS

| | | |
|---|---|---|
| 2017/0310497 A1 | 10/2017 | Kim et al. |
| 2017/0318548 A1 | 11/2017 | Kim et al. |
| 2018/0007589 A1 | 1/2018 | Jang et al. |
| 2018/0020382 A1* | 1/2018 | Kim .................. H04W 36/0055 |
| 2018/0077734 A1 | 3/2018 | Kim et al. |
| 2018/0242217 A1 | 8/2018 | Kim et al. |
| 2018/0302902 A1 | 10/2018 | Jeong et al. |
| 2018/0310259 A1 | 10/2018 | Kim et al. |
| 2018/0317277 A1 | 11/2018 | Kim et al. |
| 2018/0352418 A1 | 12/2018 | Lim et al. |
| 2018/0359064 A1 | 12/2018 | Kim et al. |

* cited by examiner

METHOD FOR CONTROLLING CONNECTION STATUS OF UE AND APPARATUS THEREOF

CROSS-REFERENCE TO RELATED APPLICATIONS

This application claims priority from Korean Patent Application Nos. 10-2016-0126260 and 10-2017-0116319 filed on Sep. 30, 2016 and Sep. 12, 2017.

BACKGROUND OF THE INVENTION

Field of the Invention

The present disclosure relates to a method for controlling a connection status of a user equipment (UE) and an apparatus thereof and to a technology for controlling a connection status of a UE which may configure a specific RRC status.

More particularly, the present disclosure relates to a specific procedure and a method for removing ambiguity of a UE connection status when a specific RRC status such as a light connection status is configured in a UE set with a power saving mode.

Description of the Related Art

In accordance with development of a communication system, various wireless terminals have been introduced to consumers such as businesses and individuals. A current 3GPP series mobile communication system such as a long term evolution (LTE) or LTE-advanced is a high speed and large capacity communication system which transmits and receives various data such as images or wireless data beyond a voice-oriented service. Accordingly, it requires a technology for transmitting large capacity data at a high speed as fast as transmission in a wired communication network.

Further, due to increase of a UE which uses machine type communication (hereinafter, referred to as "MTC" communication), data transmission/reception through a mobile communication system is abruptly increased. In the meantime, the MTC communication needs to periodically transmit and receive a small amount of data, and a low power and low cost UE may be used for the MTC communication.

Therefore, there is a demand for a technology for transmitting and receiving data by a plurality of UEs while reducing power consumption.

Specifically, in the case of a UE which periodically or aperiodically transmits a small amount of data, a RRC connection status needs to be changed to transmit the small amount of data. However, according to the related art, in order to change the RRC connection status, a data transmitting/receiving procedure between a UE and a base station and between a base station and a core network is very complicated.

The data transmitting/receiving procedure causes a relatively very high data load as compared with a small amount of data which will be transmitted by the UE. That is, an unnecessary data overload problem may be caused during a RRC connection status changing procedure for transmitting a small amount of data. Such a problem may cause increase of a data load in an entire communication system as the number of terminals which periodically transmit a small amount of data is increased.

Therefore, it is required to conduct studies on a specific UE connection status changing method and procedure which may transmit and receive a small amount of data without significantly increasing a data load of an entire communication system in accordance with change of a wireless communication environment. Specifically, when a new RRC status which is different from the RRC connection status and a RRC idle status is defined so that the UE configures the corresponding connection status, a specific connection status changing procedure is required.

Further, when the UE configures a power saving mode for saving a power of the UE, a method for solving a confliction problem of the above-described new RRC status and the power saving mode is required.

SUMMARY OF THE INVENTION

In order to solve the above-mentioned problem, a procedure may be provided for controlling a connection status of a UE by obtaining information by a base station when the UE configures a power saving mode in accordance with an embodiment of the present disclosure.

Further, a specific procedure may be provided for suppressing configuration of a specific RRC status according to another embodiment of the present disclosure when a base station and a core network entity (for example, MME) share information on a connection status of a UE and the UE configures the power saving mode.

According to an aspect of the present disclosure, there is provided a method for controlling a connection status of a UE by a base station. The method includes receiving specific RRC status instruction information for a UE from a mobility management entity (MME: control plane core network entity) and determining a RRC status for the UE based on the specific RRC status instruction information when the RRC status for the UE is changed in which the specific RRC status is different from a RRC connection status and a RRC idle status.

According to another aspect of the present disclosure, there is provided a method for controlling a connection status of a UE by an MME. The method includes receiving NAS signaling including power saving mode parameter request information from a UE, setting a specific RRC status instruction information for the UE based on the NAS signaling, and transmitting the specific RRC status instruction information for the UE to a base station in which the specific RRC status is different from a RRC connection status and a RRC idle status.

According to another aspect of the present disclosure, there is provided a base station which controls a connection status of a UE. The base station includes a receiving unit configured to receive specific RRC status instruction information for the UE from a mobility management entity (MME) and a control unit configured to determine a RRC status for the UE based on the specific RRC status instruction information when the RRC status for the UE is changed in which the specific RRC status is different from a RRC connection status and a RRC idle status.

According to another aspect of the present disclosure, there is provided a mobile management entity (MME) which controls a connection status of a UE. The MME includes a receiving unit configured to receive the NAS signaling including power saving mode parameter request information from the UE, a control unit configured to set specific RRC status instruction information for a UE based on the NAS signaling, and a transmitting unit configured to transmit the specific RRC status instruction information for the UE to the base station in which the specific RRC status is different from a RRC connection status and a RRC idle status.

According to the above-described exemplary embodiments, when a UE which configures a specific RRC status configures a power saving mode, it may suppress an error from being incurred due to a redundant configuration of the specific RRC status.

Further, according to the exemplary embodiments, the base station and the core network entity share information on a UE connection status to suppress confliction of UE connection status configuration.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
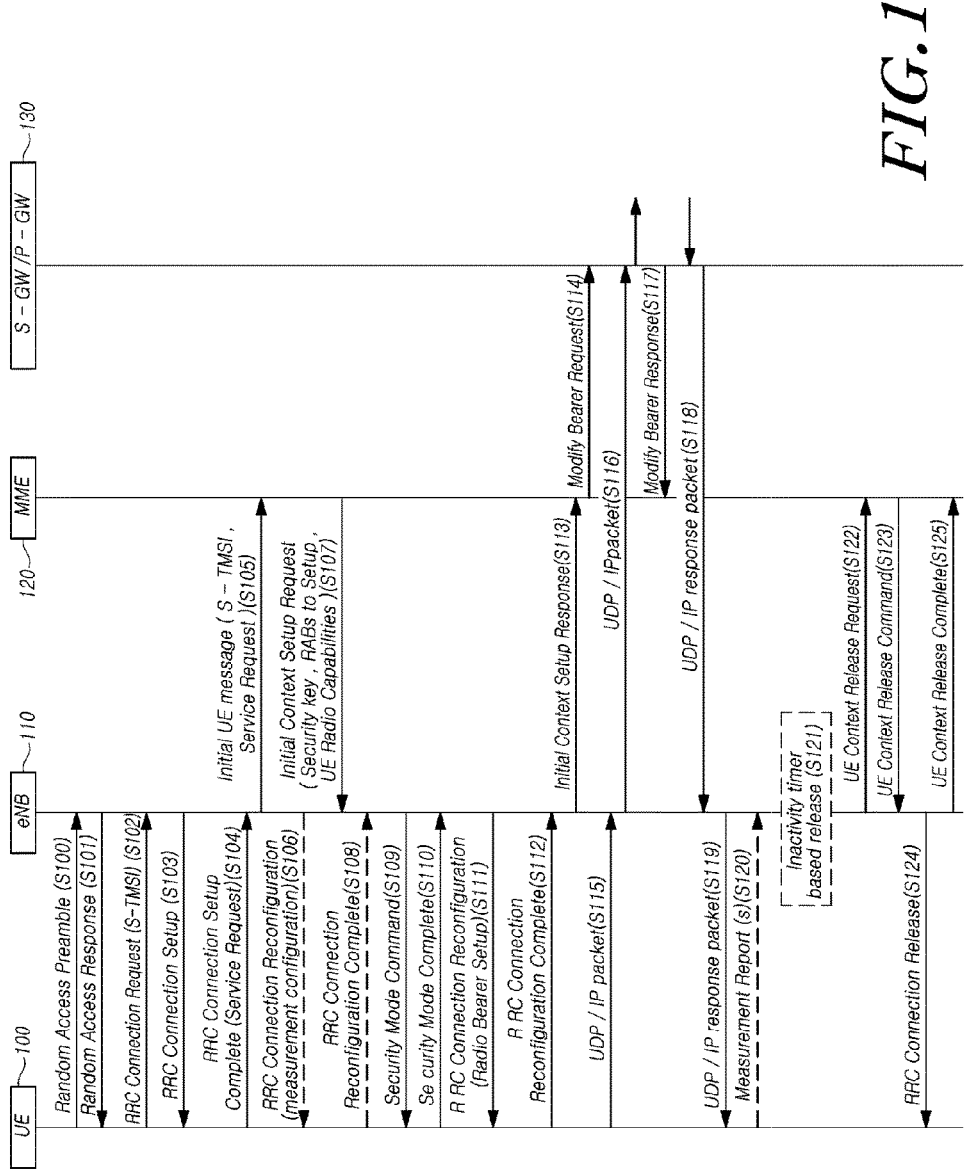
FIG. 1 is a view for explaining a message processing procedure according to an LTE technology of the related art.

Hereinafter, some exemplary embodiments of the present disclosure will be described in detail with reference to the accompanying drawings. When reference numerals denote components in the drawings, even though the like components are illustrated in different drawings, it should be understood that like reference numerals refer to the same components. In addition, in the description of the present disclosure, the detailed descriptions of publicly known related constitutions or functions thereof may be omitted if they make the gist of the present disclosure unclear.

In other words, in this specification, the machine type communication (MTC) terminal may refer to 3GPP Release-13 low cost (or low complexity) UE category/type which performs an LTE based MTC related operation and is newly defined. Alternatively, in this specification, the MTC terminal may refer to a UE category/type defined in an existing 3GPP Release-12 or below which supports an enhanced coverage as compared with the existing LTE coverage or supports low power consumption or a newly defined Release-13 low cost (or low complexity) UE category/type.

The wireless communication system is widely disposed to provide various communication services such as voice, packet data, and the like. The wireless communication system includes user equipment (UE) and a base station (BS or eNB). In this specification, the UE is a comprehensive concept which means a terminal in a wireless communication and needs to be interpreted as a concept which includes not only user equipment (UE) in a wideband code division multiple access (WCDMA), LTE, and high speed packet access (HSPA), but also a mobile station (MS), a user terminal (UT), a subscriber station (SS), and a wireless device in a GSM.

A base station or a cell generally refers to a station which performs communication with a user terminal. The base station or the cell is also referred to as another terminology such as a node-B, evolved node-B (eNB), a sector, a site, a base transceiver system (BTS), an access point, a relay node, a remote radio head (RRH), a radio unit (RU), or a small cell.

That is, in this specification, the base station or the cell needs to be interpreted as a comprehensive meaning indicating a partial area or function covered by a base station controller (BSC) in the CDMA, a Node-B of WCDMA, or an eNB or a sector (site) in an LTE and is a meaning including all various coverage areas such as a megacell, a macrocell, a microcell, a picocell, a femtocell, a relay node, an RRH, an RU, and a small cell communication range.

In various cells listed above, there is a base station which controls each cell, so that the base station may be interpreted by two meanings. According to a first meaning, the base station may be a device itself which provides a megacell, a macrocell, a microcell, a picocell, a femtocell, or a small cell in relation to the wireless area or according to a second meaning, the base station indicates the wireless area itself. According to the first meaning, when devices which provide a predetermined wireless area are controlled by the same entity or interact to configure the wireless area in cooperation with each other, all the device are indicated as a base station. Depending on a configuring method of a wireless area, eNB, RRH, an antenna, RU, LPN, a point, a transmission/reception point, a transmission point, and a reception point may be examples of the base station. According to the second meaning, the wireless area in which a signal is transmitted or received by a user terminal or a neighboring base station may be indicated as a base station.

Therefore, the megacell, the macrocell, the microcell, the picocell, the femtocell, the small cell, the RRH, the antenna, the RU, the low power node (LPN), the point, the eB, the transmission/reception point, the transmission point, and the reception point are collectively referred to as a base station.

In this specification, the user terminal and the base station are used as a comprehensive meaning as two transmission and reception subjects used to implement a technique or a technical field described in this specification, but is not limited by a term or a word which is specifically referred to. The user terminal and the base station are used as a comprehensive meaning as two (uplink or downlink) transmission and reception subjects used to implement a technique or a technical field described in this specification, but is not limited by a term or a word which is specifically referred to. Here, the uplink (UL) means a method for transmitting and receiving data to the base station by a user terminal and the downlink (DL) means a method for transmitting and receiving data to the user terminal by the base station.

There are no limitation on multiple access technique which is applied to a wireless communication system. Various multiple access techniques may be used, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA. Exemplary embodiments of the present disclosure may be applied to resource allocation such as asynchronous wireless communication which evolves into LTE and LTE-advanced through global systems for mobile communication (GSM), wideband code division multiple access (WCDMA), and high speed packet access (HSPA) and synchronous wireless communication which evolves into CDMA, CDMA-2000, and UMB. The present disclosure should not be interpreted to be restricted or limited to a specific wireless communication field and should be interpreted to include all technical fields to which a spirit of the present invention is applicable.

Herein, for uplink and downlink transmission, one of a time division duplex (TDD) technique and a frequency deivion duplex (FDD) technique may be used. In the TDD technique, transmission is performed by different times. In the FDD technique, transmission is performed by using different frequencies.

Further, in a system such as LTE or LTE-advanced, the uplink and the downlink are configured with respect to one carrier wave or carrier wave pair to configure a specification. The uplink and the downlink transmit control information through a control channel such as a physical downlink control channel (PDCCH), a physical control format indicator channel (PCFICH), a physical hybrid ARQ indicator channel (PHICH), a physical uplink control channel (PUCCH), or an physical downlink control channel (EPDCCH). The uplink and the downlink are configured by a data channel such as a physical downlink shared channel (PDSCH) or a physical uplink shared channel (PUSCH) to transmit data.

In the meantime, the control information may be transmitted also using enhanced PDCCH or extended PDCCH (EPDCCH).

In this specification, the cell may refer to a component carrier which has a coverage of a signal transmitted from a transmission/reception point or a coverage of a signal transmitted from a transmission/reception point (a transmission point or a transmission/reception point), or a transmission/reception point itself.

The wireless communication system to which the exemplary embodiments are applied may be a coordinated multi-point transmission/reception system (CoMP system), a coordinated multi-antenna transmission system, or a coordinated multi-cell communication system in which two or more transmission/reception points cooperate to transmit a signal. The CoMP system may include at least two multiple transmission/reception points and terminals.

The multi transmission/reception point may be i) a base station or ii) a macro cell (hereinafter, referred to as an 'eNB) and at least one RRH which is connected to the eNB by an optical cable or an optical fiber to be wirely controlled and has a high transmission power or low transmission power in the macro cell area.

Hereinafter, the downlink refers to communication or a communication channel from the multiple transmission/reception point to the terminal and the uplink refers to communication or a communication channel from the terminal to the multiple transmission/reception point. A transmitter in the downlink may be a part of the multiple transmission/reception point and a receiver may be a part of the terminal. A transmitter in the uplink may be a part of the terminal and a receiver may be a part of multiple transmission/reception point.

Hereinafter, a situation in which a signal is transmitted or received through a channel such as PUCCH, PUSCH, PDCCH, EPDCCH, and PDSCH may be described that PUCCH, PUSCH, PDCCH, EPDCCH, and PDSCH are transmitted or received.

Further, hereinafter, a description that PDCCH is transmitted or received or a signal is transmitted or received through PDCCH may also mean that EPDCCH is transmitted or received or a signal is transmitted or received through EPDCCH.

That is, a physical downlink control channel which will be described below may refer to PDCCH or EPDCCH or may be used as a meaning including both PDCCH and EPDCCH.

Further, for the convenience of description, EPDCCH which is exemplary embodiments of the present disclosure may be applied to a portion described as PDCCH and EPDCCH may also be applied to a portion described as EPDCCH, as exemplary embodiments of the present disclosure.

In the meantime, high layer signaling which will be described below include RRC signaling which transmits RRC information including a RRC parameter.

An eNB performs downlink transmission to the terminals. The eNB may transmit a physical downlink shared channel (PDSCH) which is a main physical channel for unicast transmission and a physical downlink control channel (PDCCH) for transmitting downlink control information such as scheduling required to receive PDSCH and scheduling approval information for transmission in an uplink data channel (for example, a physical uplink shared channel (PUSCH)). Hereinafter, when the signal is transmitted/received through each channel, it is described that the corresponding channel is transmitted or received.

UE Connection Status Transition Procedure

In the mobile communication technology of the related art, a status between the UE and the network is divided into a UE idle status and a connection status. The statuses of the UE and the network match. For example, the statuses (for example, a RRC status and an ECM status) in a wireless network (E-UTRAN) and a core network match. That is, when the UE transits to a RRC IDLE status, the network enters the ECM IDLE status, and when the UE transits to a RRC CONNECTED status, the network enters the ECM CONNECTED status. When the UE in the idle status transmits data in accordance with the UE status, a complex signaling process as illustrated in FIG. 1 needs to be performed. Specifically, when the UE transmits a small amount of data, a large overhead is caused.

FIG. 1 is a view for explaining a message processing procedure according to an LTE technology of the related art.

Referring to FIG. 1, a UE 100 transmits a random access preamble to a base station 110 in order to transmit data by being transited from a RRC idle status to a RRC connection status (S100). Next, the UE 100 receives a random access response from the base station 110 (S101) and transmits a RRC connection setup request to the base station 110 (S102).

The base station 110 sets a RRC connection setup in the UE (S103) and the UE 100 reports completion (S104). In step S103, the UE transits to the RRC connection status (RRC_CONNECTED).

When the RRC connection setup to the UE 100 is completed, the base station 110 transmits an initial UE message to the MME 120 to request a service (S105). The MME 120 requests an initial context setup to the base station 110 (S107). Between steps S105 and S107, the base station 110 transmits a RRC connection reconfiguration message to the UE 100 to set a measurement configuration (S106). When the measurement configuration is completed, the UE 100 transmits the RRC connection reconfiguration message to the base station 110 (S108).

The base station 110 transmits a security mode command to the UE 100 (S109) and receives a response therefor (S110).

Next, the base station 110 transmits a RRC connection reconfiguration message for a radio bearer setup to the UE 100 (S111) and receives a response therefor (S112). The base station 110 transmits a response for an initial context setup to the MME 120 (S113) and the MME 120 transmits a bearer modification request to a gateway 130 (S114).

The UE 100 transmits a UDP/IP packet to the base station 110 (S115) and the base station 110 transmits the packet to the gateway 130 (S116). The gateway 130 transmits a response for the bearer modification to the MME 120 (S117) and transmits a UDP/IP packet response to the base station 110 (S118). The base station 110 transmits the corresponding packet to the UE 100 (S119).

The UE 100 transmits the packet to the core network through the above-described procedure.

Next, the UE 100 periodically transmits the measurement report to the base station 120 in accordance with the measurement configuration or transmits the measurement report to the base station 120 at the time of occurrence of an event. The base station 120 determines whether to release the UE 100 based on the measurement report or an inactivity timer (S121). When it is determined to release the RRC connection of the UE 100, the base station 110 transmits a UE context release request to the MME 120 (S122). The MME 120 transmits a UE context release command to the base station 110 (S123) and the base station 110 accordingly transmits a RRC connection release instruction to the UE 100. In step S124, the UE transits to the RRC idle status (RRC_IDLE).

After releasing the RRC connection of the UE 100, the base station 110 transmits a response to the MME 120 (S125).

The RRC connected UE transits to the RRC idle status through the above-described procedure.

As described above, according to the related art, in order to transit the UE from the RRC idle status to the RRC connection status or from the RRC connection status to the RRC idle status, it is necessary to perform a plurality of signaling procedures between the UE and the base station and between the base station and the core network. During this procedure, when the UE periodically transmits a small amount of data, the overhead is consistently generated. In the meantime, the UE may be maintained to be a connected status in order to reduce the overhead due to the status transition. However, in this case, even though the data is not transmitted, a network status needs to be periodically measured according to the measurement configuration, and the measurement result needs to be reported. Accordingly, unnecessary power consumption may be caused. Further, when the RRC connection status is maintained, a handover signaling overhead is unsatisfactorily increased in accordance with the movement of the UE.

Connection Status Transition Procedure for NB-IoT Terminal

A narrow band internet of thing (NB-IoT) terminal is operated in a fixed status so that the NB IoT terminal is installed in a specific position or located within a specific range. Due to this characteristic, the NB-IoT terminal and the base station support a suspend/resume procedure. In the RRC connection release message, the base station may request the UE to maintain an AS context in the RRC idle status. When the UE receives a RRC connection release message including RRC suspend information to transit to the RRC idle status (or before the base station transmits the message to the UE), the base station sends an S1 message for requesting the status transition of the UE to enter an ECM idle status.

An RRC connection resume procedure is used to transit from the RRC idle status in which information previously stored in the UE and the base station is used to resume the RRC connection to the RRC connection status. When the terminal initiates a RRC connection resume procedure to transit to the RRC connection status (after the base station transmits the RRC connection resume message to the UE), the base station sends an S1 message for requesting a status transition of the UE to the core network to enter an ECM connection status.

Figure 2:
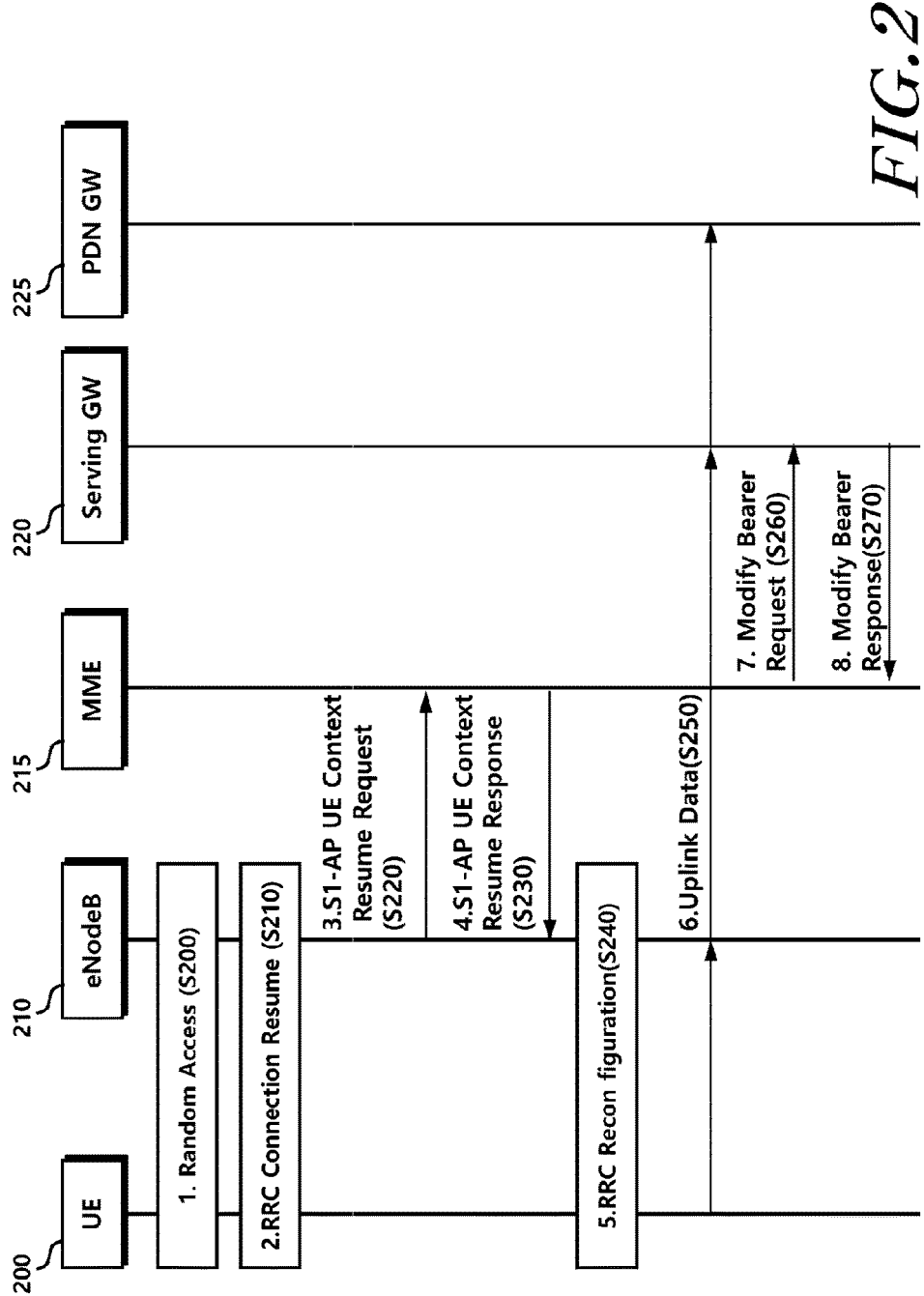
FIG. 2 is a view for explaining a UE initiated connection resume procedure of the related art.

FIG. 2 is a view for explaining a UE initiated connection resume procedure of the related art.

Referring to FIG. 2, a UE 200 performs a random access procedure with the base station 210 (S200). Next, the UE 200 initiates a RRC connection resume procedure with the base station 210 to resume the RRC connection (S210).

The base station 210 transmits a S1-AP UE context resume request to an MME 215 (S220) and receives the S1-AP context resume response (S230). When the base station 210 receives the UE context resume response, the base station 210 performs the RRC reconfiguration procedure with the UE 220 to change a connection status of the UE 200 to the RRC connection status.

Next, the UE 200 transmits uplink data to the core network via the base station 210, the MME 215, a serving gateway 220, and a PDN gateway 225. The MME 225 transmits a modification bearer request to the serving gateway 220 (S260) and receives a modification bearer response from the serving gateway 220 (S270).

The UE (for example, the NB-IoT UE) resumes the RRC connection through the above-described procedure to transmit and receive data.

However, also in this case, the RRC connection status and the ECM connection status are similarly formed. Thus unnecessary overhead between the base station and the core network is caused. That is, as described above, in the mobile communication technology of the related art, there is a signaling overhead problem due to the status transition. A suspend/resume procedure for a UE in a fixed position may reduce the signaling overhead problem. However, such a suspend/resume procedure may be applied only to the NB-IoT terminal. Therefore, when the UE gets out of a cell (or a base station) which provides a previously stored AS context, in order to transmit uplink data, the UE needs to initiate a service request procedure as illustrated in FIG. 1. Further, transition between the suspend status and the resume status of the UE is similar to the transition between the idle status and the connection status, so that the core network signaling (S1 signaling) is consistently caused.

In order to solve the above-described problem, there is a demand for a specific procedure for transiting a radio network connection status only without causing core network signaling. Further, it is necessary to develop a specific connection status changing procedure in accordance with movement of a UE which configures a specific connection status in order to reflect mobility of the UE.

UE Power Saving Mode

The UE may adopt a power saving mode (PSM) to reduce power consumption of the UE. Even though the PSM is similar to Power-off, the UE maintains registration with a network. Further, re-attach or resetting of the PDN connection is not necessary. The PSM terminal is not promptly reachable for a mobile call forwarding service. The PSM is intended for a terminal which is expected to be capable of adopting only a rare mobile outgoing or forwarding service and a corresponding delay in a mobile forwarding communication.

When the UE is capable of adopting the PSM and the UE wants to use the PSM, the terminal may request an active time value at every attach and during a TAU procedure. Further, the UE may request a periodic TAU/RAU timer value. If the UE does not request the active time, the network shall not allocate the active time.

If the network allocates the active time value, when the UE and MME enter the ECM idle from the ECM connection, the UE and the MME start the active timer with the active time value allocated by the network. If the UE is being operated, when the transition to the ECM connection mode is generated, the UE stops the active timer. When the active timer is expired, the UE deactivate an access stratum (AS) function and enters the PSM. The UE stops all idle mode procedures by deactivating the AS function in the PSM. In contrast, the UE continues to operate an arbitrary NAS timer which may be applied together with a periodic TAU timer. In order to perform the periodic TAU procedure, the UE may resume the AS function and the idle mode procedure before the periodic TAU timer expires.

Exemplary embodiments which will be described below may be applied to all of UEs, base stations, and core network entities (MME) which use mobile communication technologies. For example, the exemplary embodiments may be applied not only to a mobile communication terminal to which an LTE technology is applied, but also to a next generation mobile communication (for example, five generation (5G) mobile communication, or New RAT) terminal, a base station, and a core network entity (AMF: access and mobility function). For example, the base station may indicate an eNode-B of LTE/E-UTRAN or a base station (CU, DU, or an entity in which a central unit (CU) and a distribute unit (DU) are implemented as one logical entity) in a 5G wireless network in which the CU and the DU are divided or gNB. For the convenience of description, the core network entity may indicate an MME which is a control plane core network entity of the EPC or an AMF which is a control plane core network entity of the 5GC.

Further, a specific RRC status which is described in the present specification means a separate RRC status which is different from the RRC connection status and the RRC idle status of the related art. For example, the specific RRC status means a RRC status in which the UE or the base station stores a terminal context and supports an RAN initiation paging operation. That is, the RRC status is classified into three statuses including the RRC connection status, the RRC idle status, and the specific RRC status. The specific RRC status is merely an arbitrary terminology for defining a new RRC status including the above-described characteristic and is not limited thereto. For example, the specific RRC status may be referred to as a light connection status or a RRC inactive status.

Hereinafter, the light connection status is described as an example of the specific RRC status as needed, but the RRC inactive status which is applied to the 5G mobile communication technology is also similarly applied. Accordingly, in the present specification, the specific RRC status, the light connection status, and the RRC inactive status are used in combination as needed, and for the convenience of description, the light connection status will be mainly described.

Light Connection Status

In 3GPP, there have been studies conducted on a light connection status to reduce signaling. Major functions for a lightly connected UE are as follows:

S1 connection is maintained in an anchor base station (anchor eNB) and is in an active status.

RAN initiation paging is supported.

A paging procedure is controlled by the anchor base station.

An RAN based paging area may be UE-specifically configured.

The same mechanism as a cell-reselection mechanism of the RRC idle is used when cell-reselection based mobility is performed.

The UE AS context is maintained in at least one of the UE and the anchor base station.

In the MME, the EMC status is an EMC connection status.

As described above, there is a signaling overhead problem according to status transition in the mobile communication technology of the related art. In order to reduce the problem, studies have been conducted on a specific RRC status (which will be described as a light connection status below for the convenience of description). When the UE configured by light connection gets out of the paging area, the UE performs paging update through a new cell through cell-reselection. However, the core network entity may not know an exact status of the lightly connected UE. Since the S1 connection is maintained in the core network entity, the lightly connected UE is also considered to be an ECM connected status.

For example, the UE requests PSM through NAS signaling, and the MME confirms the PSM to configure an active time in the UE. The base station does not know the PSM configuration through the NAS signaling. Therefore, the UE in the PSM may be processed to have a light connection status through the MME. In this case, it is difficult to smoothly perform the PSM operation and the light connection operation due to a status inconsistency between the base station and the core network. For example, it may be ambiguous whether the UE performs a PSM operation or a lightly connected status operation. Further, there may be a problem in that the base station and the core network differently recognize the connection status of the UE.

That is, according to the related art, the UE requests the PSM through the NAS signaling and the MME checks the PSM request to configure the PSM. In contrast, the light connection is configured by the base station. Therefore, the status inconsistency between the base station and the core network may be caused. Thus it is difficult to smoothly perform the PSM operation and the light connection operation.

In order to solve the above-described problems, an object of the present disclosure is to provide a specific signaling for a lightly connected UE and a detailed operating method according to the signaling. Specifically, another object of the present disclosure is to provide an effective processing method and procedure when the UE configures the PSM through the NAS signaling.

Hereinafter, a signaling method for a UE to configure a specific RRC status and to prevent confliction with the PSM according to various embodiments will be described. The exemplary embodiments which will be described below may be used individually or by an arbitrary combination. Further, in the following description, an anchor base station refers to a base station which configures a RRC connection with the UE and configures a specific RRC status in the UE.

First Exemplary Embodiment: Method for Triggering S1 Connection Release when PSM and Light Connection are Configured Together When the UE is capable of adopting the PSM and the UE wants to use the PSM, the UE may request an active timer (for example, T3324) value at every attach and during a TAU procedure. When the MME adopts the attach or a tracking area procedure, the MME provides a specific value for the active timer (T3324) to adopt the usage of the PSM.

The UE may receive a PSM active timer value through the NAS signaling (attach accept or tracking area update accept message).

When the active timer expires or an active time which is provided by the network is zero, the UE may deactivate the AS function and activate the PSM.

The anchor base station does not know a PSM request of the UE through the NAS signaling and a response of the MME. Therefore, the anchor base station may instruct transition to the light connection status of the UE. If the UE which has received the PSM active timer value through the NAS signaling is instructed by the anchor base station to transit to the light connection status, the UE may transit to the light connection status. For example, the anchor base station may instruct the UE by including an NAS signaling message DedicatedInfoNAS including the PSM active timer on a RRC connection reconfiguration message including a light connection configuration.

The AS of the UE may be transited to the light connection status in accordance with the light connection status transition instruction of the anchor base station. The AS of the UE transmits the NAS signaling message included in the DedicatedInfoNas information to the NAS. When the active time is received as zero on the NAS signaling message, the NAS of the UE may (promptly) enter the PSM.

The MME which responds by setting the active timer as zero on the NAS signaling message may deduct that the UE is not reachable. The MME may clear a paging proceed flag (PPF) for the UE. For example, if an implicit detach timer expires before the UE contacts the network, the MME deducts that the UE is out of a coverage for a long time and implicitly detaches the UE. As another example, the MME may trigger the S1 connection release. The MME transmits an S1 connection release message (for example, UE context release command) to the anchor base station. The S1 connection release message which is transmitted to the anchor base station by the MME may include cause information. For example, as the cause information, the release of the S1 connection due to the PSM may be received. As another example, the cause information may include information instructing that the RRC connection release is not sent to the UE. However, this is for the convenience of description and arbitrary information instructing the UE to perform a separate procedure for releasing the RRC connection by the corresponding instruction information in accordance with the triggering of the S1 connection is also included in the scope of the present exemplary embodiment.

The anchor base station may not perform the separate procedure for releasing the RRC connection on the lightly connected UE. According to the related art, when the S1 connection release is triggered, if the RRC connection is not released, the base station needs to transmit the RRC connection release message to the UE. Further, when the message is confirmed by the UE, the base station releases the UE context.

As another example, the AS of the UE may transit to the light connection status in accordance with the light connection status transition instruction of the anchor base station. When the active time is received as zero on the NAS signaling message, the NAS of the UE may (promptly) enter the PSM. The MME which responds by setting the active timer as zero on the NAS signaling message may deduct that the UE is not reachable. The MME may clear a paging proceed flag (PPF) for the UE. The MME instructs bearer release to the S-GW to receive response. For example, the MME may receive response through release access bearer request/response. When the S1 connection is released, the anchor base station may discard (or release) a stored UE context. The anchor base station may receive the release of the S1 connection due to the PSM as the cause information. The anchor base station may not perform the separate procedure for releasing the lightly connected UE.

As another example, if call forwarding data (downlink data) is received, when the S1 connection of the corresponding UE is released, the S-GW may send a downlink data notification message to the MME to instruct the MME to perform paging. If the PSM is applied to the UE, the UE may clear the paging proceed flag (PPF) from the MME. When the PPF is cleared, the MME does not page a UE in the E-UTRAN coverage when the downlink data notification message is received from the S-GW. The MME transmits a downlink data notification reject message to the S-GW.

Second Exemplary Embodiment: Method for Removing Stored UE AS Context if Mobile Outgoing Communication is Triggered when PSM and Light Connection are Configured Together If the UE is capable of adopting the PSM and the UE wants to use the PSM, the UE may request an active timer (T3324) value at every attach and during a TAU procedure. When the MME adopts the attach or a tracking area procedure, the MME provides a specific value for the active timer (for example, T3324) to adopt the usage of the PSM. The UE may receive a PSM active timer value through the NAS signaling (attach accept or tracking area update accept message).

When the active timer expires or an active time which is provided by the network is zero, the UE may deactivate the AS function and activate the PSM.

The anchor base station does not know the PSM request and response through the NAS signaling. The anchor base station may instruct transition to the light connection status of the UE. If the UE which has received the PSM active timer value through the NAS signaling is instructed by the anchor base station to transit to the light connection status, the UE may transit to the light connection status. For example, the anchor base station may instruct the UE by including an NAS signaling message DedicatedInfoNas including the PSM active timer in a RRC connection reconfiguration message including a light connection configuration.

The AS of the UE may transit to the light connection status in accordance with the light connection status transition instruction of the anchor base station. The AS of the UE transmits the NAS signaling message included in the DedicatedInfoNAS information to the NAS. When the active time is received as zero on the NAS signaling message, the NAS of the UE may (promptly) enter the PSM.

If mobile outgoing signaling or mobile outgoing data is generated, the UE in the PSM status may resume an idle mode procedure and the AS function at an arbitrary time for the mobile outgoing communication. When the RRC connection setting for the mobile outgoing signaling or the mobile outgoing data is instructed by an upper layer, the AS of the UE may perform the RRC connection setting procedure as an example. Alternatively, the AS of the UE performs the RRC connection resume procedure and transits to the RRC connection status. Further, the AS of the UE sends a base station initial UE message to the MME to perform an initial context setup procedure.

If the UE configured as the light connection receives instruction of the RRC connection setting for the mobile outgoing signaling or the mobile outgoing data from the upper layer, the UE may perform one or more of the following operations:

The UE resets an MAC

The UE discards/removes the stored UE AS context.

The UE releases all wireless resources including release of an RLC entity for all set wireless bearers, the MAC configuration, and an associated PDCP entity.

Third Exemplary Embodiment: Method for Processing Failure Through MME by Anchor Base Station if S1 Connection is Maintained when PSM and Light Connection are Configured Together When the UE is capable of adopting the PSM and the UE wants to use the PSM, the UE may request an active timer (for example, T3324) value at every attach and during a TAU procedure. When the MME adopts the attach or a tracking area procedure, the MME provides a specific value for the active timer (T3324) to adopt the usage of the PSM. The UE may receive a PSM active timer value through the NAS signaling (for example, attach accept or tracking area update accept message).

When the active timer expires or an active time which is provided by the network is zero, the UE may deactivate the AS function and activate the PSM.

The anchor base station does not know the PSM request and response through the NAS signaling. The anchor base station may instruct transition to the light connection status of the UE. If the UE which has received the PSM active timer value through the NAS signaling is instructed by the anchor base station to be transited to the light connection status, the UE may be transited to the light connection status. For example, the anchor base station may instruct the UE by including an NAS signaling message DedicatedInfoNas including the PSM active timer in a RRC connection reconfiguration message including a light connection configuration.

The AS of the UE may transit to the light connection status in accordance with the light connection status transition instruction of the anchor base station. The AS of the UE transmits the NAS signaling message included in the DedicatedInfoNas information to the NAS. When the active time is received as zero on the NAS signaling message, the NAS of the UE may (promptly) enter the PSM.

If call forwarding data (downlink data) is received, when the corresponding UE is configured as the light connection to maintain the S1 connection, the downlink data which will be transmitted to the UE may be transmitted to the anchor base station. The anchor base station may perform RAN based paging. However, since the UE enters the PSM to deactivate the AS function of the UE, the UE may not respond therefor. For example, the downlink data is temporarily generated before the S1 connection is released while entering the PSM or the S1 connection release is not triggered in the PSM.

For example, when the paging fails, the anchor base station may transmit an S1 message including a failure cause to the MME. The MME may indicate to the S-GW that the downlink data transmission fails. For example, the MME may indicate that the downlink data transmission fails through a DDN failure message or transmit the message including cause information.

As another example, when the paging fails, the anchor base station may transmit an S1 message including a cause thereof to the MME. When the PPF is cleared from the UE, the MME may response the base station by including information indicating that the PSM is applied to the UE. Accordingly, the paging cannot be performed.

As another example, when the PFF is set, the MME may indicate information for informing that the PPF is set to the anchor base station.

As another example, the MME may instruct S1 connection release to the anchor base station.

As another example, the anchor base station releases the UE context and transmits the S1 message (for example, the UE context release request) including a cause of paging failure to the MME. The MME instructs the bearer release to the S-GW to receive response (for example, release bearer request/response). The MME may transmit the S1 release response message (for example, the UE context release response) to the anchor base station.

As another example, the anchor base station may transmit the downlink data to the S-GW.

As still another example, the anchor base station may transmit the downlink data to the MME.

Fourth Exemplary Embodiment: Method for Transmitting Information Instructing not to Configure Light Connection when the PSM is Configured The base station and the MME share information on whether the UE configures the PSM. When the PSM is configured in the UE, the base station may not configure the specific RRC status (for example, light connection status) in the UE.

When the UE is capable of adopting the PSM and the UE wants to use the PSM, the UE may request an active timer (for example, T3324) value at every attach and during a TAU procedure. When the MME adopts the attach or a tracking area procedure, the MME provides a specific value for the active timer (for example, T3324) to adopt the usage of the PSM. The UE may receive a PSM active timer value through the NAS signaling (for example, attach accept or tracking area update accept message).

When the active timer expires or an active time which is provided by the network is zero, the UE may deactivate the AS function and activate the PSM.

The anchor base station does not know the PSM request and response through the NAS signaling between the UE and the MME. Therefore, the anchor base station may instruct transition to the light connection status of the UE. If the UE which has received the PSM active timer value through the NAS signaling is instructed by the anchor base station to transit to the light connection status, the UE may transit to the light connection status. For example, when the anchor base station instructs the UE by including an NAS signaling message including the PSM active timer on the RRC connection reconfiguration message including the light connection configuration in DedicatedInfoNAS information or the UE receives the RRC connection reconfiguration message including the light connection configuration from the anchor base station after receiving the PSM active timer.

The AS of the UE may transit to the light connection status in accordance with the light connection status transition instruction of the anchor base station.

When the lightly connected UE is in the ECM connected status, the lightly connected UE may not enter the PSM.

Similarly, since the MME maintains the S1 connection so that it is in the ECM connected status for the UE, the MME may not enter the PSM.

Differently from the request of the UE and the configuration by the response of the MME, the UE operates in the light connection status.

In the light connection status, the power consumption is small as compared with the connection status, but the power consumption may be generated as compared with a power saving mode in which the AS function is deactivated.

As described above, there may be a problem in that the connection status of the UE may be differently controlled in the core network and the base station.

As an example for avoiding the above-described problem, when the MME receives the NAs message which requests the active timer value or receives UE capability information which supports the PSM, and when the MME transmits a response message therefor, assistance information which may be helpful for the UE connection status configuration of the base station may be included to be transmitted. For example, the MME may transmit information indicating that the PSM is enabled. As another example, the MME may transmit information indicating that a communication function which supports a high latency is enabled. As still another example, the MME may transmit information instructing the base station not to configure the light connection in the UE. Further, as another example, the MME may transmit the PSM active timer value. As another example, the MME may transmit information indicating that the PSM is accepted. As another example, the MME may transmit information indicating that the PSM active time is included. The information which is transmitted to the base station by the MME is provided only for the convenience of description. Therefore, arbitrary information which is helpful for the UE connection status configuration of the base station in accordance with the PSM active timer configuration is also included in the scope of the present exemplary embodiment.

In the meantime, the information which is helpful for the UE connection status configuration which is transmitted to the base station by the MME may be included on the initial context setup request message. Further, the above-described information may be included in the UE context resume message or the UE context modification request message.

The base station which receives the above-described information may store the information in the UE context. If the above-described information is received, the base station may not configure the light connection in the UE.

The above-described information may be used for the base station to change the connection status of the UE which is in the RRC connection status in accordance with the inactivity timer.

The above-described operations of the MME and the base station will be described in more detail with reference to the drawings.

Figure 3:
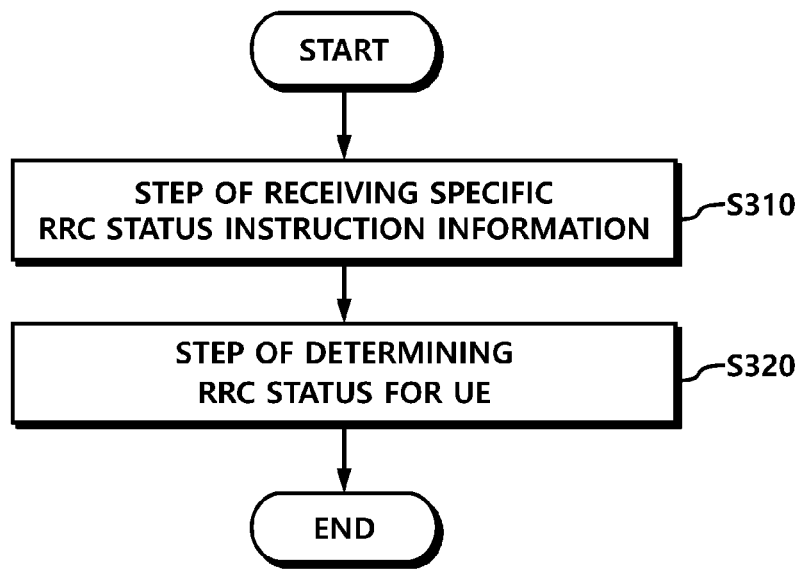
FIG. 3 is a flowchart for explaining operations of a base station according to an exemplary embodiment.

FIG. 3 is a flowchart for explaining operations of a base station according to an exemplary embodiment.

Referring to FIG. 3, a base station may perform a step of receiving specific RRC status instruction information for a UE from a mobility management entity (MME) (S310). In accordance with at least one embodiment, the specific RRC status is different from the RRC connection status and the RRC idle status and refers to a light connection status or a RRC inactive status in which a UE context is stored and an RAN initiation paging operation is supported.

For example, the specific RRC status instruction information is included in an initial context setup request message or a UE context modification request message to be received by the base station. The specific RRC status instruction information refers to assistance information which allows the MME to help the base station to configure a UE connection status.

Therefore, the specific RRC status instruction information may include a value indicating that a specific RRC status for the UE is supported or not supported. To this end, the MME may determine a value in the specific RRC status instruction information depending on whether to receive power saving mode (PSM) parameter request information from the UE.

For example, when the MME receives the NAS signaling including the power saving mode parameter request information from the UE, the MME may transmit the specific RRC status instruction information including a value indicating that a specific RRC status is not supported to the base station. That is, the MME informs the information indicating whether the PSM is configured in the UE to the base station through a value included in the specific RRC status instruction information to help the base station to configure the connection status of the UE.

When the base station changes the RRC status for the UE, the base station may perform a step of determining a RRC status for the UE based on the specific RRC status instruction information (S320).

The base station may identify a supporting or non-supporting value included in the specific RRC status instruction information received from the MME to determine the RRC status of the UE. That is, the base station may indirectly identify whether to configure the PSM of the UE through the specific RRC status instruction information received from the MME. Further, the base station may determine the RRC status of the UE by referring whether to configure the PSM of the UE.

For example, when the RRC status instruction information includes a value indicating that the specific RRC status instruction information does not support the specific RRC status for the UE, the base station may determine the connection status of the UE to be configured as a RRC idle status.

As another example, when the RRC status instruction information includes a value indicating that the specific RRC status instruction information supports the specific RRC status for the UE, the base station may determine the connection status of the UE to be configured as a specific RRC status.

That is, the base station may determine whether the connection status of the UE is changed from the RRC connection status to the RRC idle status or changed to the specific RRC status in accordance with the value indicating that the specific RRC status is supported or not supported in the specific RRC status instruction information received from the MME. For example, when the UE does not request the PSM configuration to the MME through the NAS signaling, the MME transmits a fact that the UE supports the specific RRC status by being included in the specific RRC status instruction information to the base station. When the connection status of the UE needs to be changed from the RRC connection status to the specific RRC status, the base station may change the connection status of the UE to the specific RRC status or the RRC idle status. In contrast, when the UE requests the PSM configuration to the MME through the NAS signaling, the MME includes information indicating that the UE does not support the specific RRC status in the specific RRC status instruction information and transmits the specific RRC status instruction information to the base station. When the connection status of the UE needs to be changed from the RRC connection status to the specific RRC status or the RRC idle status, the base station may change the connection status of the UE to the RRC idle status in consideration of the PSM.

By doing this, the base station may control the connection status of the UE not to conflict with the PSM.

Figure 4:
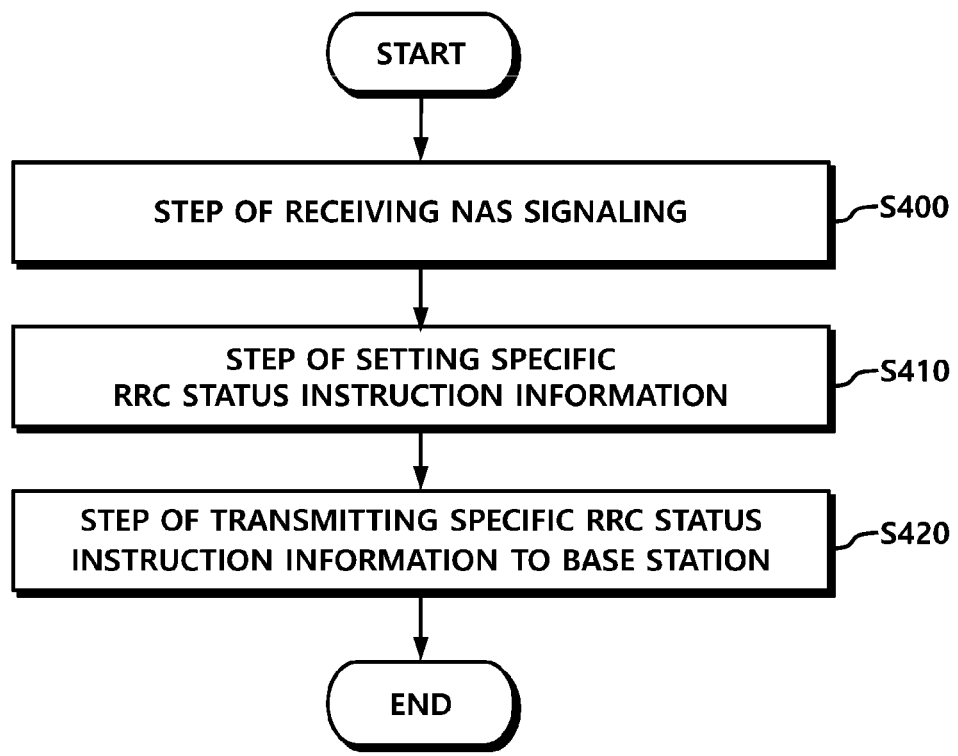
FIG. 4 is a flowchart for explaining an MME operation according to an exemplary embodiment.

FIG. 4 is a flowchart for explaining an MME operation according to an exemplary embodiment.

Referring to FIG. 4, the MME may perform a step of receiving NAS signaling including power saving mode parameter request information from the UE. As described above, the MME may receive the PSM parameter request information from the UE. For example, the UE which requests the PSM configuration may request an active timer (for example, T3324) value to the MME through the NAS signaling at every attach and during the TAU procedure. In this case, the MME may determine that the UE requests the PSM configuration.

The MME may perform a step of setting the specific RRC status instruction information for the UE based on the NAS signaling (S410). Here, the specific RRC status is different from the RRC connection status and the RRC idle status and refers to a light connection status or a RRC inactive status in which a UE context is stored and an RAN initiation paging operation is supported.

The specific RRC status instruction information refers to assistance information which allows the MME to help the base station to configure a UE connection status. Therefore, the specific RRC status instruction information may include a value indicating that the specific RRC status for the UE is supported or not supported.

For example, when the MME receives the NAS signaling including the power saving mode parameter request information from the UE, the specific RRC status instruction information may set by including a value indicating that a specific RRC status is not supported. In contrast, when the MME does not receive the power saving mode parameter request information from the UE, the specific RRC status instruction information may be set by including a value indicating that the specific RRC status is supported.

By doing this, the MME may indirectly inform the base station of information indicating whether the UE configures the PSM.

The MME may perform a step of transmitting specific RRC status instruction information for the UE to the base station (S420).

For example, the specific RRC status instruction information is included in an initial context setup request message or a UE context modification request message to be transmitted to the base station.

The MME may inform the base station of information indicating whether the PSm is configured in the UE through a value which is included in the specific RRC status instruction information. When the base station changes the RRC status for the UE, the base station may determine the RRC status for the UE based on the specific RRC status instruction information.

For example, when the RRC status instruction information includes a value indicating that the specific RRC status instruction information does not support the specific RRC status for the UE, the base station may determine the connection status of the UE to be configured as a RRC idle status.

As another example, when the RRC status instruction information includes a value indicating that the specific RRC status instruction information supports the specific RRC status for the UE, the base station may determine the connection status of the UE to be configured as a specific RRC status.

That is, the base station may determine whether the connection status of the UE is changed from the RRC connection status to the RRC idle status or changed to the specific RRC status in accordance with the value indicating that the specific RRC status is supported or not supported in the specific RRC status instruction information received from the MME. For example, when the UE does not request the PSM configuration to the MME through the NAS signaling, the MME includes information indicating that the UE supports the specific RRC status in the specific RRC status instruction information and transmits the specific RRC status instruction information to the base station. When the connection status of the UE needs to be changed from the RRC connection status to the specific RRC status, the base station may change the connection status of the UE to the specific RRC status. In contrast, when the UE requests the PSM configuration to the MME through the NAS signaling, the MME includes information indicating that the UE does not support the specific RRC status in the specific RRC status instruction information and transmits the specific RRC status instruction information to the base station. When the connection status of the UE needs to be changed from the RRC connection status to the RRC idle status, the base station may change the connection status of the UE to the RRC idle status in consideration of the PSM.

Through the above-described method, the MME may inform the base station of the information on the PSM configuration of the UE which is performed through the NAS signaling and the base station may determine whether to change the RRC status of the UE by reflecting the information.

Fifth Exemplary Embodiment: Method for Transmitting PSM Request Instructing Information to Base Station When the UE is capable of adopting the PSM and the UE wants to use the PSM, the UE may request an active timer (for example, T3324) value at every attach and during a TAU procedure. When the NAS of the UE indicates an attach request message or TAU message including the active timer T3324, the AS of the UE may transmit the NAS signaling message corresponding to the DedicatedInfoNAS information to the base station. When the AS of the UE transmits the DedicatedInfoNAS which includes the attach request message or TAU message including the active timer T3324 to the base station, assistance information which may be helpful for the UE configuration of the base station is also included on the RRC message to be transmitted.

For example, the UE may include information indicating that the PSM is requested. As another example, the MME may include information instructing the base station not to configure the light connection in the UE. As another example, the UE may include a PSM active timer value (request value). As another example, the UE may include information indicating that a PSM active timer is included. The above-described information is merely provided for the convenience of description, and arbitrary information for helping the base station for the UE configuration in accordance with the PSM active timer configuration is also included in the scope of the present disclosure.

As another example, the above-described information may be included on a RRC connection setup complete message. As another example, the above-described information may be included on a RRC Connection resume complete message.

The base station receives the above-described information and stores the received information in the UE context. If the above-described information is received, the base station may not instruct the light connection in the UE.

Sixth Exemplary Embodiment: Method of Informing AS that Active Time is Configured on NAS in UE When the UE is capable of adopting the PSM and the UE wants to use the PSM, the UE may request an active timer (for example, T3324) value at every attach and during a TAU procedure. When the MME adopts the attach or a tracking area procedure, the MME provides a specific value for the active timer (T3324) to adopt the usage of the PSM. The UE may receive a PSM active timer value through the NAS signaling (for example, attach accept or tracking area update accept message).

When the active timer expires or an active time which is provided by the network is zero, the UE may deactivate the AS function and activate the PSM.

When the active timer is configured in the UE (the NAS of the UE) or the active timer expires in the UE (or the NAS of the UE), the UE may inform the AS. If the light connection is configured, the UE may inform the base station.

Seventh Exemplary Embodiment: Method for Transmitting Entering of Cell Instructing Light Connection to NAS When the UE is capable of adopting a light connection function and a selected cell supports the light connection function, the AS of the UE instructs information informing that the UE is capable of adopting a light connection function and a selected cell supports the light connection function to the NAS. The NAS of the UE may not allow the UE to request for the PSM based thereon. The UE which may use the light connection function may not request the PSM.

Eighth Exemplary Embodiment: Method for Controlling PSM Active Timer by Instructing the NAS to Configure the Light Connection when the Light Connection is Configured If the UE is capable of adopting the PSM and the UE wants to use the PSM, the UE may request an active time value at every attach and during a TAU procedure. When the UE receives the PSM active time value through the NAS signaling, the UE may be instructed to configure light connection by the (anchor) base station.

When the UE receives the RRC message (for example, RRC connection reconfiguration message) instructing the light connection by the base station, the AS of the UE may inform the NAS. When the PSM active time is configured, the NAS of the UE may control the active timer based on the PSM active time.

For example, the active timer may be removed. As another example, when the attach or the TAU procedure is initiated through next outgoing signaling, the message may be sent to the MME without including the active timer.

For another example, when the base station instructs the light connection to the UE, the base station may also transmit a timer value instructing the lightly configured UE to transit to the RRC IDLE status after a predetermined time elapses. Upon the receipt of the light configuration, the UE starts the timer. When data is transmitted or received before the timer expires, the UE restarts (or releases) the data. When the timer expires, the UE enters a RRC IDLE (or performs one or more of operations for entering the RRC IDLE (or operations for leaving the RRC connected defined in 3GPP TS 36.331 document)). The AS of the UE instructs the NAS. The UE transits from the ECM connected to the ECM idle status.

In accordance with at least one embodiment, the conflict between the PSM configuration of the UE and the specific RRC status (for example, the light connection status) configuration may be prevented. Therefore, the connection status ambiguity of the UE may be solved in accordance with the above-described exemplary embodiments.

Hereinafter, a method for transiting a non-access stratum (NAS) status and a light connection status of a UE will be described. The following methods may be individually used or combined with each other.

For example, the method for transiting to the NAS status and the light connection status of the lightly connected UE will use the following methods individually or by combining the following methods.

When the light connection status is recognized by the NAS (UE NAS: ECM-connected status, UE AS: RRC-idle status)

For example, when the UE configures the light connection through the RRC signaling, the RRC of the UE may inform the NAS. In this case, even though the UE is ECM-connected, the NAS of the UE may consider that the UE is in a RRC-idle status. Alternatively, it is understood that the NAS of the UE is in a light connection status. The NAS of the UE maintains the NAS context.

When the NAS signaling or MO data is triggered, the NAS upper layer may instruct to transit to the connection status through the AS context in which the RRC is maintained/stored.

In the suspend/resume procedure for the NB-IoT terminal of the related art, RRC Connection Resume Request is initiated by the instruction of the upper layer. When the RRC connection is resumed by the instruction of the upper layer, a resume cause (resumeCause-r13) which is included on the RRC connection resume request message has one of the following establishment causes (EstablishmentCause-NB-r13).

EstablishmentCause-NB-r13::=ENUMERATED {mt-Access, mo-Signalling, mo-Data, mo-ExceptionData,spare4, spare3, spare2, spare1}

In order to transit the lightly connected UE to the connection status, the base station should recognize the cause to extract the UE AS context from the anchor base station. As an example for distinguishing and instructing it, the upper layer and/or RRC Connection Resume Request message may use to indicate instruction information of distinguishing it using one of spare values of establishment causes (EstablishmentCause-NB-r13) for indicating the resume causes (resumeCause-r13).

As another example for distinguishing and instructing it, the upper layer and/or the RRC connection resume request message may instruct the instruction information of distinguishing it by defining a field different from the resume cause (resumCause-r13). By doing this, the base station may confirm that the resume causes are mt-Access, mo-Signalling, mo-Data, mo-ExceptionData, the resume request message is triggered to transit the lightly connected UE to the connection status, and it is instructed to extract the UE AS context from the anchor base station. For still another example for distinguishing and instructing it, the upper layer and/or the RRC connection resume request message may instruct by defining a field which instructs that the establishment cause on the existing resume cause (resumeCause-r13) and the resume request message are triggered to transit the lightly connected UE to the connection status, and the UE AS context is extracted from the anchor base station.

When the light connection status is recognized by the NAS (UE NAS: ECM-Idle status, UE AS: RRC-idle status)

For another example, when the UE configures the light connection through the RRC signaling, the RRC of the UE may inform the NAS. For example, the RRC may transmit information indicating the light connection status to the NAS. In this case, the NAS of the UE may consider that the UE is ECM-IDLE and RRC-idle statuses. It is understood that the UE is in the light connection status. Alternatively, it is understood that the NAS of the UE is in a light connection status.

The NAS of the UE may perform one or more of the following operations.

The UE maintains the NAS context.

The UE stores the NAS context.

Even though the UE releases the NAS context, the UE stores the NAS context. When the NAS signaling or the MO data is triggered to the UE, the UE reuses/resumes/restores/maintains/invokes the NAS signaling or the MO data.

The UE suspends the NAS context. When the NAS signaling or the MO data is triggered to the UE, the UE reuses/resumes/restores/maintains/invokes the NAS signaling or the MO data.

When the NAS signaling or the MO data is triggered, the NAS/upper layer transmits the NAS signaling or the MO data to the RRC. The RRC may transit to the connection status through the maintained/stored AS context.

In the suspend/resume procedure for the NB-IoT terminal of the related art, RRC Connection Resume Request is initiated by the instruction of the upper layer. When the RRC connection is resumed in accordance with the instruction of the upper layer, the resume cause (resumeCAuse-r13) included on the RRC connection resume request message may have one value of the following establishment causes (EstablishmentCause-NB-r13).

EstablishmentCause-NB-r13::=ENUMERATED {mt-Access, mo-Signalling, mo-Data, mo-ExceptionData,spare4, spare3, spare2, spare1}

In order to transit the lightly connected UE to the connection status, the base station should recognize the cause to extract the UE AS context from the anchor base station. For an example for distinguishing and instructing it, the upper layer and/or RRC Connection Resume Request message may use to indicate instruction information of distinguishing it using one of spare values of establishment causes (EstablishmentCause-NB-r13) for indicating the resume causes (resumeCause-r13).

For another example for distinguishing and instructing it, the upper layer and/or the RRC connection resume request message may instruct the instruction information of distinguishing it by defining a field different from the resume cause (resumCause-r13). By doing this, the base station may confirm that the resume causes are mt-Access, mo-Signalling, mo-Data, mo-ExceptionData, the resume request message is triggered to transit the lightly connected UE to the connection status and it is instructed to extract the UE AS context from the anchor base station. For still another example for distinguishing and instructing it, the upper layer and/or the RRC connection resume request message may instruct by defining a field which instructs that the establishment cause on the existing resume cause (resumeCause-r13) and the resume request message are triggered to transit the lightly connected UE to the connection status, and the UE AS context is extracted from the anchor base station.

When the light connection status is not recognized by the NAS (UE NAS: ECM-connected status, UE AS: RRC-idle status)

For another example, when the light connection is configured in the UE through the RRC signaling, the RRC of the UE may not inform the NAS. In this case, the NAS of the UE may consider that the UE is the ECM-connected status. The AS (or the RRC) of the UE may be considered to be a RRC-idle status. It is understood that the UE (or the AS or the RRC of the UE) is the light connection status. When the NAS signaling or the MO data is triggered, the NAS/upper layer transmits the NAS signaling or the MO data to the SRB or the DRB. When the data is transmitted to the SRB/DRB, it transmits to the connection status through the AS context in which the RRC is maintained/stored.

As described above, it is possible to remove a connection status ambiguity problem of the UE by preventing the confliction with the light connection status configuration when the PSM status is configured in accordance with the request of the UE in the network.

Hereinafter, a configuration of a base station and an MME which may perform a part or all of the above-described operations according to exemplary embodiments will be described with reference to the drawings.

Figure 5:
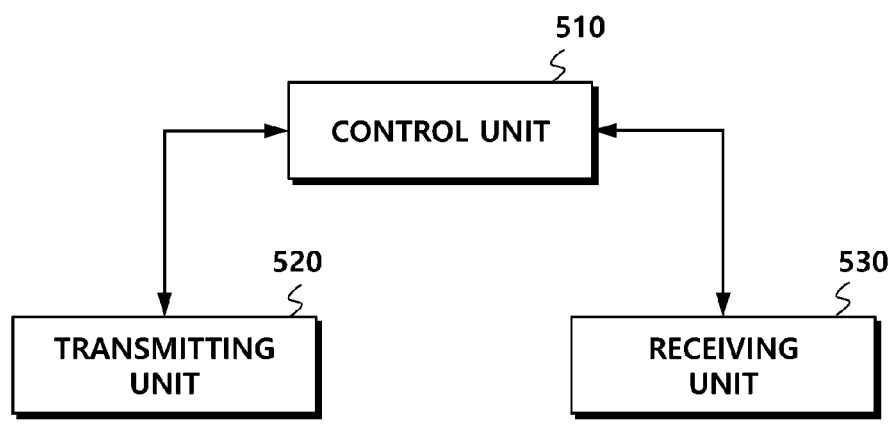
FIG. 5 is a block diagram for explaining a configuration of a base station according to an exemplary embodiment.

FIG. 5 is a view for explaining a configuration of a base station according to an exemplary embodiment.

Referring to FIG. 5, a base station 500 controls a connection status of a UE in accordance with at least one embodiment. The base station 500 may include a receiving unit 530 and a control unit 510. The receiving unit 530 receives a specific RRC status instruction information for the UE from a mobility management entity (MME). The control unit 510 determines the RRC status for the UE based on the specific RRC status instruction information when the RRC status for the UE is changed.

In accordance with at least one embodiment, the specific RRC status is different from the RRC connection status and the RRC idle status. Such a specific RRC status refers to a light connection status or a RRC inactive status in which a UE context is stored and an RAN initiation paging operation is supported.

The receiving unit 530 may receive the specific RRC status instruction information included in an initial context setup request message or the UE context modification request message. The specific RRC status instruction information refers to assistance information which allows the above-described MME to help the base station to configure a UE connection status. Therefore, the specific RRC status instruction information may include a value indicating that the specific RRC status for the UE is supported or not supported. To this end, the MME may determine a value included in the specific RRC status instruction information depending on whether to receive power saving mode (PSM) parameter request information from the UE. For example, when the MME receives the NAS signaling including the power saving mode parameter request information from the UE, the MME may transmit the RRC specific status instruction information including a value indicating that a specific RRC status is not supported to the base station. That is, the MME may inform the base station of information indicating whether the PSm is configured in the UE through a value included in the specific RRC status instruction information.

In the meantime, a transmitting unit 520 may transmit instruction information for changing a determined RRC status to the UE.

In addition to this, the transmitting unit 520 and the receiving unit 530 are used to transmit and receive signals, messages, and data required to implement the above-described exemplary embodiments between the UE and the MME.

The control unit 510 may identify at least one of a supporting value and a non-supporting value, which are included in the specific RRC status instruction information received from the MME to determine the RRC status of the UE. That is, the control unit 510 may indirectly identify whether the UE configures the PSM through the specific RRC status instruction information received from the MME. Further, the control unit 510 may determine the RRC status of the UE by referring whether to configure of the PSM of the UE.

For example, when the RRC status instruction information includes a value indicating that the specific RRC status instruction information does not support the specific RRC status for the UE, the control unit 510 may determine the connection status of the UE to be configured as a RRC idle status.

For another example, when the RRC status instruction information includes a value indicating that the specific RRC status instruction information supports the specific RRC status for the UE, the control unit 510 may determine the connection status of the UE to be configured as a specific RRC status.

That is, the control unit 510 may determine whether the connection status of the UE is changed from the RRC connection status to the RRC idle status or changed to the specific RRC status in accordance with the value indicating that the specific RRC status is supported or not supported in the specific RRC status instruction information received from the MME. For example, when the UE does not request the PSM configuration to the MME through the NAS signaling, the MME includes information indicating that the UE supports the specific RRC status in the specific RRC status instruction information and transmits the information to the base station through the specific RRC status instruction information. When the connection status of the UE needs to be changed from the RRC connection status to the specific RRC status, the control unit 510 may change the connection status of the UE to the specific RRC status. In contrast, when the UE requests the PSM configuration to the MME through the NAS signaling, the MME includes information indicating that the UE does not support the specific RRC status in the specific RRC status instruction information and transmits the information to the base station. When the connection status of the UE needs to be changed from the RRC connection status to the RRC idle status, the control unit 510 may change the connection status of the UE to the RRC idle status in consideration of the PSM.

In addition to this, the control unit 150 may control the overall operation of the base station 500 to provide various methods and procedures for determining whether to configure the specific RRC status of the UE by utilizing information indicating whether the base station configures the PSM of the UE required to perform the above-described exemplary embodiments.

Figure 6:
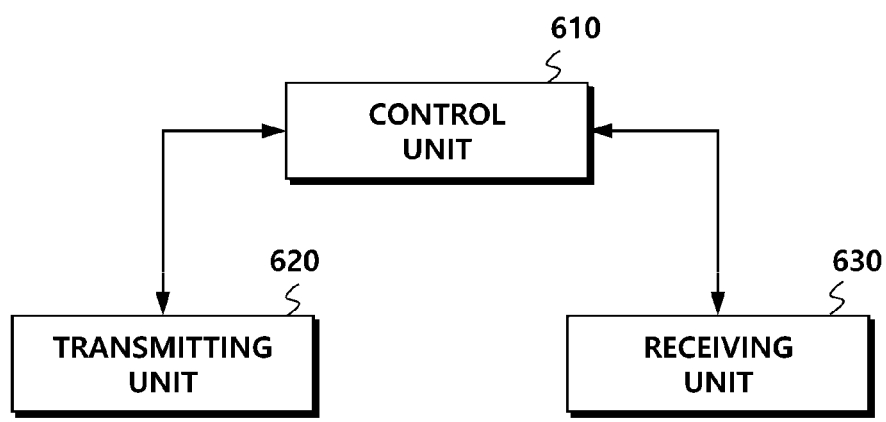
FIG. 6 is a block diagram for explaining an MME configuration according to an exemplary embodiment.

FIG. 6 is a view for explaining an MME configuration according to an exemplary embodiment.

Referring to FIG. 6, the MME 600 controls the connection status of the UE in accordance with at least one embodiment. The MME 600 may include a receiving unit 630, a control unit 610, and a transmitting unit 620. The receiving unit 630 receives the NAS signaling including power saving mode parameter request information from the UE. The control unit 610 sets specific RRC status instruction information for a UE based on the NAS signaling. The transmitting unit 620 transmits the specific RRC status instruction information for the UE to the base station.

The receiving unit 630 may receive PSM parameter request information from the UE. For example, when the UE requests the PSM configuration, the UE may request an active timer (for example, T3324) value to the MME 600 through the NAS signaling at every attach and during the TAU procedure. In this case, the MME 600 may determine that the UE requests the PSM configuration.

The control unit 610 may set the specific RRC status instruction information for the UE based on the NAS signaling. In accordance with at least one embodiment, the specific RRC status is different from the RRC connection status and the RRC idle status. Such a specific RRC status refers a light connection status or a RRC inactive status in which a UE context is stored and an RAN initiation paging operation is supported.

The specific RRC status instruction information refers to assistance information which allows the above-described MME 600 to help the base station to configure a UE connection status. Therefore, the specific RRC status instruction information may include a value indicating that the specific RRC status for the UE is supported or not supported.

For example, when the MME 600 receives the NAS signaling including the power saving mode parameter request information from the UE, the control unit 610 may set the specific RRC status instruction information including a value indicating that a specific RRC status is not supported. In contrast, when the MME 600 does not receive the power saving mode parameter request information from the UE, the control unit 610 may set the specific RRC status instruction information by including a value indicating that the specific RRC status is supported. By doing this, the MME 600 may indirectly inform the base station of information indicating whether the UE configures the PSM.

In the meantime, the transmitting unit 620 may include the specific RRC status instruction information in at least one of an initial context setup request message and the UE context modification request message and transmit the specific RRC status instruction information to the base station through at least one of an initial context setup request message and the UE context modification request message.

As described above, when the base station changes the RRC status for the UE, the base station may determine the RRC status for the UE based on the specific RRC status instruction information.

For example, when the RRC status instruction information includes a value indicating that the specific RRC status instruction information does not support the specific RRC status for the UE, the base station may determine the connection status of the UE to be configured as a RRC idle status.

As another example, when the RRC status instruction information includes a value indicating that the specific RRC status instruction information supports the specific RRC status for the UE, the base station may determine the connection status of the UE to be configured as a RRC idle status.

That is, the base station may determine whether the connection status of the UE is changed from the RRC connection status to the RRC idle status or changed to the specific RRC status in accordance with the value indicating that the specific RRC status is supported or not supported in the specific RRC status instruction information received from the MME 600. For example, when the UE does not request the PSM configuration to the MME 600 through the NAS signaling, the MME 600 includes information indicating that the UE supports the specific RRC status in the specific RRC status instruction information and transmits it to the base station. When the connection status of the UE needs to be changed from the RRC connection status to the specific RRC status, the base station may change the connection status of the UE to the specific RRC status. In contrast, when the UE requests the PSM configuration to the MME 600 through the NAS signaling, the MME 600 includes information indicating that the UE does not support the specific RRC status in the specific RRC status instruction information and transmit it to the base station. When the connection status of the UE needs to be changed from the RRC connection status to the RRC idle status, the base station may change the connection status of the UE to the RRC idle status in consideration of the PSM.

In addition to this, the control unit 610 may control the overall operation of the MME 600 to provide various methods and procedures for determining whether to configure the specific RRC status of the UE by utilizing information indicating whether the base station configures the PSM of the UE required to perform the above-described exemplary embodiments.

In addition, the transmitting unit 620 and the receiving unit 630 are used to transmit and receive signals, messages, and data required to implement the above described exemplary embodiments to and from the UE and the base station.

Standard contents and standard documents mentioned in the above-described exemplary embodiments are omitted for simplicity of description of the specification and configure a part of the specification. Therefore, it should be interpreted that when partial contents of the standard contents and standard documents are added to the specification or described in the claims, it is also covered by the scope of the present invention.

It will be appreciated that various exemplary embodiments of the present invention have been described herein for purposes of illustration, and that various modifications, changes, and substitutions may be made by those skilled in the art without departing from the scope and spirit of the present invention. Therefore, the exemplary embodiments of the present invention are provided for illustrative purposes only but not intended to limit the technical spirit of the present invention. The scope of the technical spirit of the present invention is not limited thereto. The protective scope of the present disclosure should be construed based on the following claims, and all the technical concepts in the equivalent scope thereof should be construed as falling within the scope of the present disclosure.

What is claimed is:

1. A method for controlling a connection status of a user equipment (UE) by a base station, the method comprising:
   receiving specific radio resource control (RRC) status instruction information for the UE from a mobility management entity (MME); and
   determining a first RRC status for the UE based on the specific RRC status instruction information when the first RRC status for the UE is changed,
   wherein the specific RRC status is different from an RRC connection status and an RRC idle status, and
   wherein the specific RRC status instruction information includes a value indicating that the specific RRC status for the UE is supported or not supported, and wherein the MME receives NAS signaling including power saving mode (PSM) parameter request information from the UE, and the specific RRC status instruction information includes the value indicating that the specific RRC status is not supported.

2. The method according to claim 1, wherein the specific RRC status is at least one of a light connection status and a RRC inactive status in which a UE context of the UE is stored and a RAN initiation paging operation is supported.

3. The method according to claim 1, wherein the specific RRC status instruction information is included in at least one of an initial context setup request message and a UE context modification request message.

4. The method according to claim 1, wherein the determining of the first RRC status comprises, when the specific RRC status instruction information includes a value indicating that the specific RRC status for the UE is not supported, determining the connection status of the UE to be configured as the RRC idle status.

5. The method according to claim 1, wherein the determining of the first RRC status comprises, when the specific RRC status instruction information includes a value indicating that the specific RRC status for the UE is supported, determining the connection status of the UE to be configured as the specific RRC status.

6. A method for controlling a connection status of a user equipment (UE) by a mobility management entity (MME), the method comprising:
   receiving non-access stratum (NAS) signaling including power saving mode parameter request information from the UE;
   setting a specific radio resource control (RRC) status instruction information for the UE based on the NAS signaling; and
   transmitting the specific RRC status instruction information for the UE to a base station,
   wherein the RRC status is different from a RRC connection status and a RRC idle status, and
   wherein the specific RRC status instruction information includes a value indicating that the specific RRC status for the UE is supported or not supported, and in the setting of specific RRC status instruction information, wherein the NAS signaling including the power saving mode parameter request information is received, a value indicating that the specific RRC status is not supported, and the value is included in the specific RRC status instruction information.

7. The method according to claim 6, wherein the specific RRC status is at least one of a light connection status and a RRC inactive status in which a UE context of the UE is stored by the base station or the UE and a RAN initiation paging operation is supported.

8. The method according to claim 6, wherein the specific RRC status instruction information is included in at least one of an initial context setup request message and a UE context modification request message, to be transmitted to the base station.

9. A base station for controlling a connection status of a user equipment (UE), the base station comprising:
   a receiver configured to receive specific radio resource control (RRC) status instruction information for the UE from a mobility management entity (MME); and
   a controller configured to determine a first RRC status for the UE based on the specific RRC status instruction information when the first RRC status for the UE is changed,
   wherein the specific RRC status is different from a RRC connection status and a RRC idle status, and wherein the specific RRC status instruction information includes a value indicating that the specific RRC status for the UE is supported or not supported and wherein the MME receives NAS signaling including power saving mode (PSM) parameter request information from the UE, and the specific RRC status instruction information includes the value indicating that the specific RRC status is not supported.

10. The base station according to claim 9, wherein the specific RRC status is at least one of a light connection status and a RRC inactive status in which a UE context of the UE is stored and a RAN initiation paging operation is supported.

11. The base station according to claim 9, wherein the specific RRC status instruction information is included in at least one of an initial context setup request message and a UE context modification request message.

12. The base station according to claim 9, wherein when the specific RRC status instruction information includes a value indicating that the specific RRC status for the UE is not supported, the controller determines the connection status of the UE to be configured as the RRC idle status.

13. The base station according to claim 9, wherein when the specific RRC status instruction information includes a value indicating that the specific RRC status for the UE is supported, the controller determines the connection status of the UE to be configured as the specific RRC status.

* * * * *